United States Patent
Furusawa

(10) Patent No.: US 7,136,127 B2
(45) Date of Patent: *Nov. 14, 2006

(54) METHOD OF MANUFACTURING DEVICE, DEVICE, AND ELECTRONIC APPARATUS

(75) Inventor: Masahiro Furusawa, Chino (JP)

(73) Assignee: Seiko Epson Corporation (JP)

( * ) Notice: Subject to any disclaimer, the term of this patent is extended or adjusted under 35 U.S.C. 154(b) by 166 days.

This patent is subject to a terminal disclaimer.

(21) Appl. No.: 10/420,526

(22) Filed: Apr. 21, 2003

(65) Prior Publication Data

US 2004/0004678 A1 Jan. 8, 2004

(30) Foreign Application Priority Data

Apr. 22, 2002 (JP) ............... 2002-119968

(51) Int. Cl.
G02F 1/1333 (2006.01)
G02F 1/136 (2006.01)

(52) U.S. Cl. ......................... 349/138; 349/43
(58) Field of Classification Search ........ 349/153–156, 349/138–139

See application file for complete search history.

(56) References Cited

U.S. PATENT DOCUMENTS

| | | | | |
|---|---|---|---|---|
| 5,920,083 A | * | 7/1999 | Bae | 257/59 |
| 6,567,147 B1 | * | 5/2003 | Hirakata | 349/153 |
| 6,717,638 B1 | * | 4/2004 | Kim | 349/106 |
| 6,908,796 B1 | * | 6/2005 | Furusawa | 438/149 |
| 2004/0005739 A1 | * | 1/2004 | Furusawa | 438/149 |

FOREIGN PATENT DOCUMENTS

| | | |
|---|---|---|
| JP | H08-313726 | 11/1996 |
| JP | 10-186412 | 7/1998 |
| JP | 2000-098367 | 4/2000 |
| JP | 2003-098548 | 4/2003 |
| WO | WO 99/48339 | 9/1999 |
| WO | 01-46987 | 12/2000 |

* cited by examiner

*Primary Examiner*—Dung T. Nguyen
(74) *Attorney, Agent, or Firm*—Harness, Dickey & Pierce, P.L.C.

(57) ABSTRACT

A pixel portion 100 of a liquid crystal display device comprises a thin film transistor T comprising a channel region 18, and source/drain regions 22, a source (data) line 26 for supplying current to the thin film transistor T, a color filter 23, and a pixel electrode 24. In forming the pixel portion 100, a gate electrode 13, a gate insulating film 16 and the channel region 18 are first formed on a glass substrate 10. On the glass substrate 10 after the formation of the channel region 18 is formed, a wall made of a polyimide film 20 surrounding the peripheries of the regions for forming the source/drain regions 22, the color filter 23, the pixel electrode 24 and the source line 26. Liquid materials are applied to the regions surrounded with a wall made of the polyimide film 20, and a heat treatment is carried out to form films, thereby forming elements such as the color filter 23 or the pixel electrode 24.

13 Claims, 16 Drawing Sheets

SECTION A-A'

(a)

(b)

SECTION A-A'

(a)

(b)

SECTION B-B'

(a)

(b)

SECTION C-C'

(a)

(b)

SECTION D-D'

(a)

(b)

SECTION E-E'

(a)

(b)

SECTION F-F'

(a)

(b)

SECTION G-G'

(a)

(b)

SECTION H-H'

(a)

(b)

SECTION I-I'

(a)

(b)

SECTION J-J'

(a)

(b)

SECTION K-K'

(a)

(b)

SECTION L-L'

(a)

(b)

SECTION M-M'

METHOD OF MANUFACTURING DEVICE, DEVICE, AND ELECTRONIC APPARATUS

BACKGROUND OF THE INVENTION

1. Technical Field of the Invention

The present invention relates to a method of manufacturing a device (for example, a liquid crystal display device or the like) comprising thin film elements such as thin film transistors, and a device manufactured by the method.

2. Description of the Related Art

Liquid crystal display devices have features of being thin and lightweight and have low power consumption, and thus they are used for various electronic apparatuses such as personal computers, mobile phones, digital still cameras, and liquid crystal televisions.

The liquid crystal display device is provided with pixel portions using active elements such as thin film transistors. As the thin film transistor constituting the pixel portion, the inversely staggered type (or bottom gate type) structure constructed by forming a gate electrode on a substrate and laminating a semiconductor layer such as a channel region or a source/drain region, or an insulating layer thereon is being widely employed.

A pixel circuit of the liquid crystal display device is constructed by combining elements such as a scanning line for supplying a signal to the gate electrode, a data line for supplying a data signal to the source/drain region or a pixel electrode connected to the source/drain region for applying voltage to a liquid crystal layer. A substrate (an array substrate) having the pixel circuit formed thereon and a substrate (a counter substrate) having a counter electrode or a color filter formed thereon are bonded together and a liquid crystal material is inserted and sealed therebetween, thereby constructing a liquid crystal panel. Then, the liquid crystal panel is provided with peripheral members such as a driving circuit or a backlight to construct a liquid crystal display device.

The aforementioned liquid crystal display device is generally manufactured by repeating the processes of forming a thin film by the vapor deposition method (that is, the vacuum process) such as the CVD method or the sputtering method, and removing (etching) the unnecessary portion of the formed thin film by the photolithography method.

However, in this conventional manufacturing method, there are disadvantages in that (1) since the process comprising the film formation and the etching is repeated many times, the manufacturing time is lengthened, (2) since most of the formed thin film is removed, the utilization efficiency of raw material is not good, and (3) since waste such as the etching solution is excessively generated, the processing cost thereof it is increased. These disadvantages make it difficult to reduce the manufacturing cost in the conventional manufacturing method. These problems become more remarkable as the glass substrate to be a basic material becomes larger with an increase in the screen size of the liquid crystal display device.

The present invention has been achieved in consideration of the above disadvantages. It is therefore an object of the present invention to provide a method of manufacturing a device which makes it possible to reduce the manufacturing cost. It is another object of the present invention to provide a device which makes it possible to realize lower cost.

SUMMARY

In order to accomplish the above objects, the present invention provides a method of manufacturing a device, at least some elements of the device are film-formed by using liquid materials, the method comprising: a step of allocating on a substrate regions for a plurality of elements constituting the device; a partition wall formation step of forming partition walls surrounding the peripheries of at least the regions for the elements using the liquid materials, among the regions for the plurality of elements; and a film formation step of applying liquid materials to the regions surrounded with the partition walls and performing a heat treatment, thereby forming films.

Since the elements constituting the device are formed by forming the partition wall surrounding the peripheries of regions for some elements of the device and then applying liquid materials to the regions surrounded with the partition walls to form thin films, the number of execution steps of the conventional process for forming the film by a combination of the vapor deposition method such as the CVD method or the sputtering method and the photolithography method can be reduced to simplify the manufacturing process and it is possible to reduce the manufacturing time. Further, since the partition wall is provided, it is possible to minimize the range to which the liquid material is applied and as a result, the utilization efficiency is excellent. Furthermore, since the number of etching processes is reduced, it is possible to reduce the amount of waste and thus to reduce the processing cost. Therefore, it is possible to reduce the manufacturing cost of device. These advantages of the present invention become more remarkable with an increase in the scale of the device to be manufactured.

It is preferable that the device comprises pixel regions each comprising a color filter and a pixel electrode. In the aforementioned partition wall formation step, the partition wall may be formed to surround the periphery of at least a first region for forming the pixel region. The aforementioned film formation step may comprise a pixel region formation step of forming the color filter and the pixel electrode in the first region.

A liquid material can be used to form a pixel electrode at low cost. The partition wall used in forming the pixel electrode is also used to form a color filter, and the pixel electrode and color filter is formed on the same region, so that it is possible to simplify the manufacturing process for the color filter. Further, since the color filter and the pixel electrode are formed on the same substrate, a counter electrode may be formed on one surface of the other substrate (counter substrate). In particular, the patterning is not required, so that it is possible to simplify the manufacturing process for the counter substrate.

In the pixel region formation step, it is preferable that the first region has a first liquid material applied thereto and is subjected to a heat treatment to form the color filter, and then the first region is applied with a second liquid material applied thereto and is subjected to a heat treatment to form the pixel electrode.

In the pixel region formation step, it is preferable that the first region has a first liquid material applied thereto and is subjected to a heat treatment to form the pixel electrode, and then the first region has a second liquid material applied thereto and is subjected to a heat treatment to form the color filter.

It is preferable that the device further comprises thin film transistors for driving the pixel electrodes each formed by sequentially laminating, in order, a gate electrode, a gate insulating film, a channel region, and source/drain regions on the substrate. In the aforementioned partition wall formation step, after the gate electrode, the gate insulating film and the channel region have been formed, the partition wall is formed on the substrate to surround each of the periphery of a first region and the periphery of a second region for forming the source/drain regions. In addition, the aforementioned film formation step further comprises a semiconductor film formation step of applying a third liquid material to the second region and performing a heat treatment, thereby forming semiconductor films for forming the source/drain regions. In such a manner, since a liquid material is also used to form the semiconductor film, it is possible to further reduce the manufacturing cost.

It is preferable that the third liquid material used in forming the semiconductor film contains a silicon compound and a dopant source. A specific example of the silicon compound includes a high-order silane photopolymerized by irradiating ultraviolet rays onto something having one or more ring-shaped structures such as cyclopentasilane ($Si_5H_{10}$) The dopant source includes a material containing a Group V element (for example, phosphorus) or a Group III element (for example, boron) Since the liquid material containing such a silicon compound and a dopant source is used for a semiconductor film, it is possible to form a heavily doped silicon film easily.

In the pixel region formation step, it is preferable that a connecting portion for electrically connecting the pixel electrode and the source/drain region is further formed using the liquid material used in forming the pixel electrode in forming the pixel electrode. In addition, it is preferable that the connecting portion is formed so as to extend over the partition wall between the pixel electrode and the source/drain regions. Since the connecting portion is further formed at the time of formation of the pixel electrode, it is possible to increasingly simplify the manufacturing process.

In the pixel region formation step, it is preferable that the first region has a first liquid material applied thereto and is subjected to a heat treatment, thereby forming a functional film having functions of both the color filter and the pixel electrode. It is preferable that the first liquid material is obtained by mixing any one of a dye, a pigment, and a conductive color resist with a liquid material for forming a conductive film. As a result, it is possible to additionally simplify the formation of pixel regions.

It is preferable that the device further comprises a thin film transistor for driving the functional film and wiring for supplying current to the thin film transistor. In the aforementioned partition wall formation step, the partition wall may be formed to surround the peripheries of the first region and a second region for forming the wiring. In addition, the film formation step may comprise a wiring formation step of applying a second liquid material to the second region and performing a heat treatment, to form a conductive film for forming the wiring. In such a manner, since the conductive film for forming wiring is also formed using a liquid material, it is possible to further reduce the manufacturing cost for the device.

It is preferable that the liquid material in forming the aforementioned conductive film contains conductive fine particles. Here, the conductive fine particles may be metallic fine particles containing any one of gold, silver, copper, palladium, and nickel, or fine particles of conductive polymer or superconductor. The metallic fine particles are more preferable. A liquid material containing such conductive fine particles can be used to form a good conductive film easily.

It is preferable that the thin film transistor is formed by sequentially laminating, in order, a gate electrode, a gate insulating film, a channel region, and source/drain regions on the substrate; and in the wiring formation step, a connecting portion for electrically connecting the functional film and the source/drain region is further formed using the liquid material used in forming the conductive film. In addition, it is preferable that the connecting portion is formed so as to extend over the partition wall between the functional film and the source/drain regions. In such a manner, since the connecting portion is further formed at the time of formation of the conductive film, it is possible to increasingly simplify the manufacturing process.

In the partition wall formation step, it is preferable that an insulating film is formed on the substrate and openings are formed in the insulating film to expose regions for elements using the liquid material, thereby forming the partition wall. In such a manner, it is possible that the partition wall surrounding the peripheries of the regions for the plurality of elements using the liquid material can be simultaneously formed by the same process.

It is preferable that the insulating film for forming the partition wall is a polyimide film. By doing so, it is possible to form the partition wall easily. In particular, in case of using a photosensitive polyimide solvent, after the substrate has the polyimide solvent applied thereto and is dried, the region corresponding to an opening is exposed and developed to be removed (in the case that the polyimide solvent is a positive type), and then the region is baked, so that it is possible to form the partition wall easily.

It is preferable that the aforementioned liquid material is supplied by a droplet ejection method. Therefore, it is possible to supply the liquid material rapidly under the control of dropping position and dropping quantity.

It is preferable that the device is a liquid crystal display device.

Further, a device of the present invention is manufactured according to the aforementioned manufacturing method. By doing so, it is possible to reduce the manufacturing cost for the device. More particularly, a device of the present invention has the constitution described below. In other words, the device of the present invention comprises a plurality of elements formed on a substrate, in which a partition wall is provided to surround the peripheries of the regions for at least some elements of the plurality of elements.

Some of the elements surrounded with the partition wall preferably are formed using liquid materials. In addition, it is preferable that the device may comprise a pixel region comprising a color filter and a pixel electrode, and a partition wall may be provided so as to surround the periphery of at least the pixel region.

It is preferable that the pixel region is formed to overlap the pixel electrode on the color filter. It is also preferable that the pixel region is formed to overlap the color filter on the pixel electrode. Moreover, it is preferable that the pixel region is formed by a functional film having functions of both the color filter and the pixel electrode.

Further, it is preferable that the device further comprises thin film transistors for driving the pixel electrodes or the functional films each formed by sequentially laminating, in order, a gate electrode, a gate insulating film, a channel region, and source/drain regions on the substrate; and the partition wall is formed to surround the periphery of the pixel region or the functional film and the periphery of the source/drain regions of the thin film transistor.

It is preferable that the device further comprises a connecting portion for electrically connecting the source/drain regions and the pixel electrode or the functional film, which is formed so as to extend over the partition wall between the pixel region or the functional film and the source/drain regions.

In addition, it is preferable that the device further comprises thin film transistors for driving the pixel electrodes and wiring for supplying current to the thin film transistors, and the partition wall is formed to surround the periphery of the pixel region and the periphery of the wiring.

It is preferable that when the aforementioned thin film transistor is formed by sequentially laminating, in order, a gate electrode, a gate insulating film, a channel region, and source/drain regions on the substrate; and the device further comprises a connecting portion for electrically connecting the source/drain regions of the thin film transistor and the wiring. In addition, it is preferable that the connecting portion is formed so as to extend over the partition wall between the source/drain regions and wiring.

It is preferable that a polyimide film forms the partition wall.

It is preferable that the device of the present invention is a liquid crystal display device. The present invention may be an electronic apparatus comprising the aforementioned device. The electronic apparatus includes a personal computer or a liquid crystal television.

DETAILED DESCRIPTION

Now, a liquid crystal display device according to one embodiment of the present invention, and a method of manufacturing the same will be described with reference to the accompanying drawings.

In the present invention, the droplet ejection method is the method of forming a desired pattern, including an ejected material, by ejecting droplets to a desired region and may be referred to as the ink jet method. In this case, the droplet to be ejected is not so-called ink used for printing, but a liquid material containing materials constituting the device. For example, the materials include one capable of functioning as a conductive material or an insulating material which constitutes the device. Further, the droplet ejection is not limited to ejection by atomization, but includes continuous ejection of the liquid material drop by drop.

Figure 1:
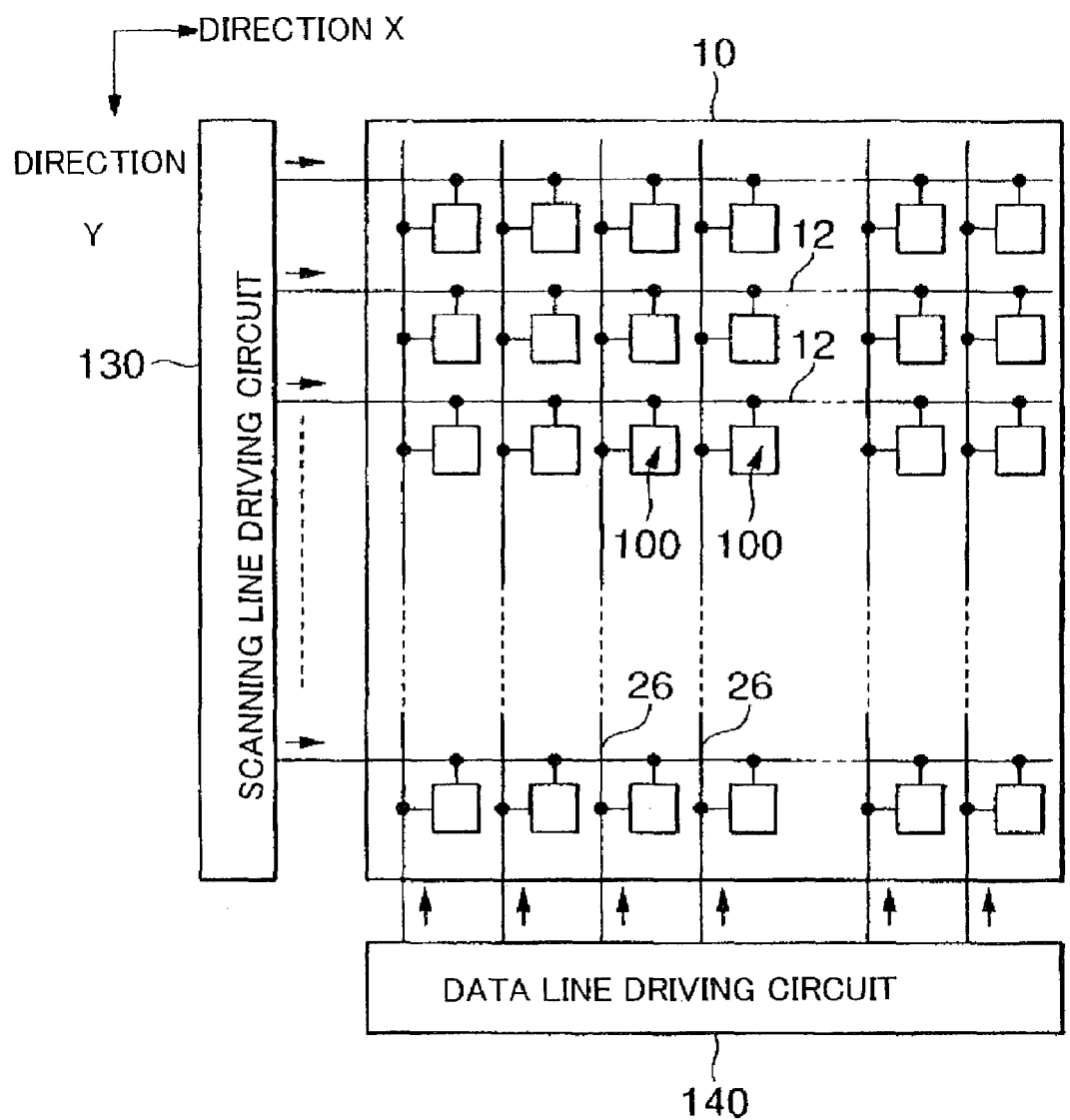
FIG. 1 is a view schematically showing a configuration of a liquid crystal display device of an embodiment according to the present invention.

FIG. 1 schematically illustrates a configuration of a liquid crystal display device of this embodiment. The liquid crystal display device of this embodiment is configured such that an element substrate (array substrate) and a counter substrate are bonded with a predetermined gap and a liquid crystal material is sandwiched therebetween. As the element substrate and the counter substrate, substrates made of a plate-shaped insulating member comprising glass, quartz or plastics can be used, and in this embodiment a glass substrate is used.

As shown in FIG. 1, a plurality of scanning lines 12 are formed on a glass substrate 10 to extend in the direction of X (row) and these scanning lines 12 are connected to a scanning line driving circuit 130. Further, a plurality of data lines 26 are formed on the glass substrate 10 to extend in the direction of Y (column) and these data lines 26 are connected to a data line driving circuit 140. Moreover, pixel portions 100 are formed to correspond to each of the intersections of the scanning lines 12 and the data lines 26 and are arranged in a matrix shape. Furthermore, the scanning line driving circuit 130 or the data line driving circuit 140 may be formed on the glass substrate 10.

Figure 2:
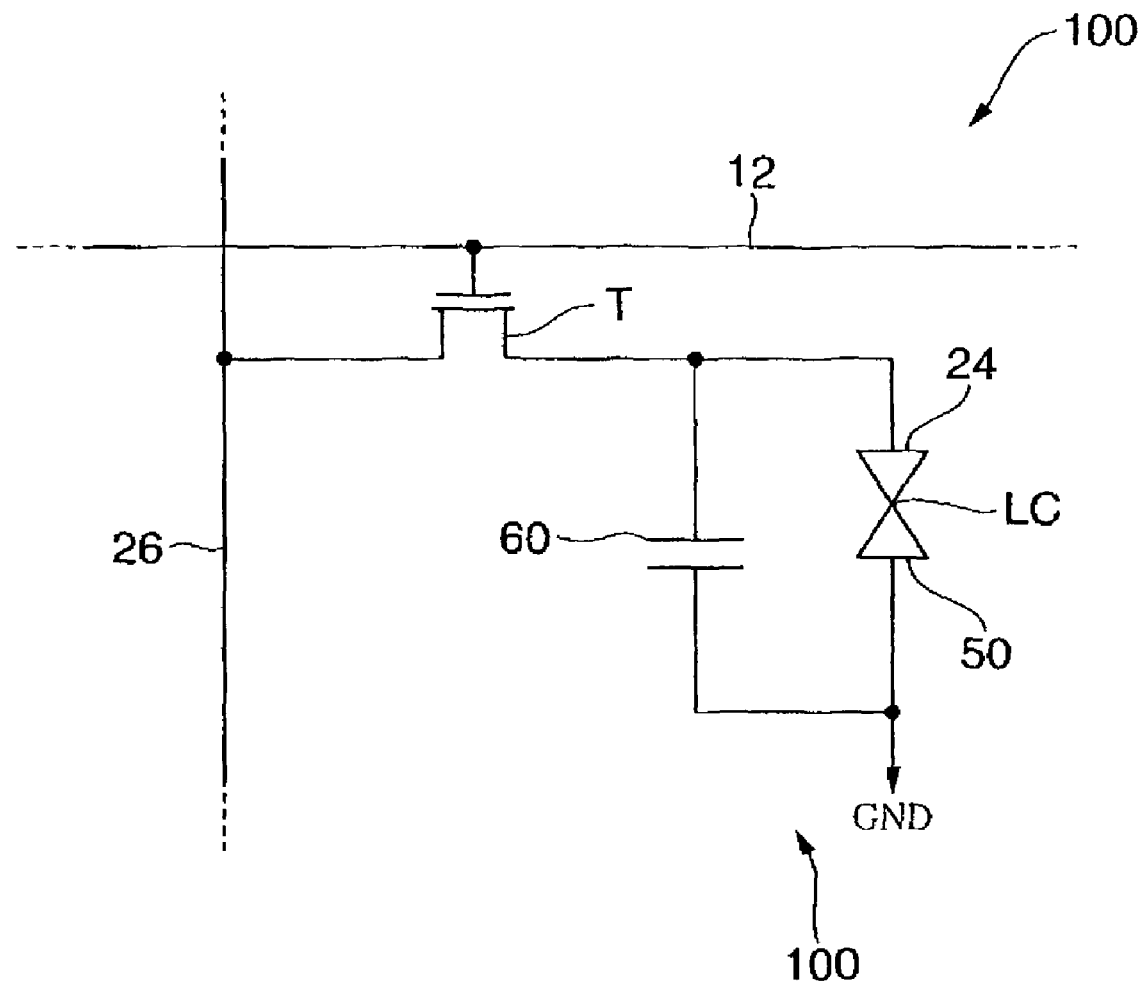
FIG. 2 is a view showing a specific configuration of a pixel portion.

FIG. 2 illustrates a specific configuration of the pixel portions 100. The pixel portion 100 shown in the drawing is configured such that a gate of a thin film transistor T is connected to the scanning line 12, a source thereof to the data line 26, and a drain thereof to a pixel electrode 24, and a liquid crystal LC as an electro-optical material is sandwiched between the pixel electrode 24 and a counter electrode 50. Further, a storage capacitor 60 is formed between the pixel electrode 24 and a ground potential GND. After voltage is applied to the pixel electrode 24 through the thin film transistor T, the storage capacitor 60 is provided for almost constantly maintaining the applied voltage for a required time. The counter electrode 50 is a transparent electrode common to the respective pixels, which is formed on one surface of the counter substrate so as to oppose the pixel electrode 24.

Figure 3:
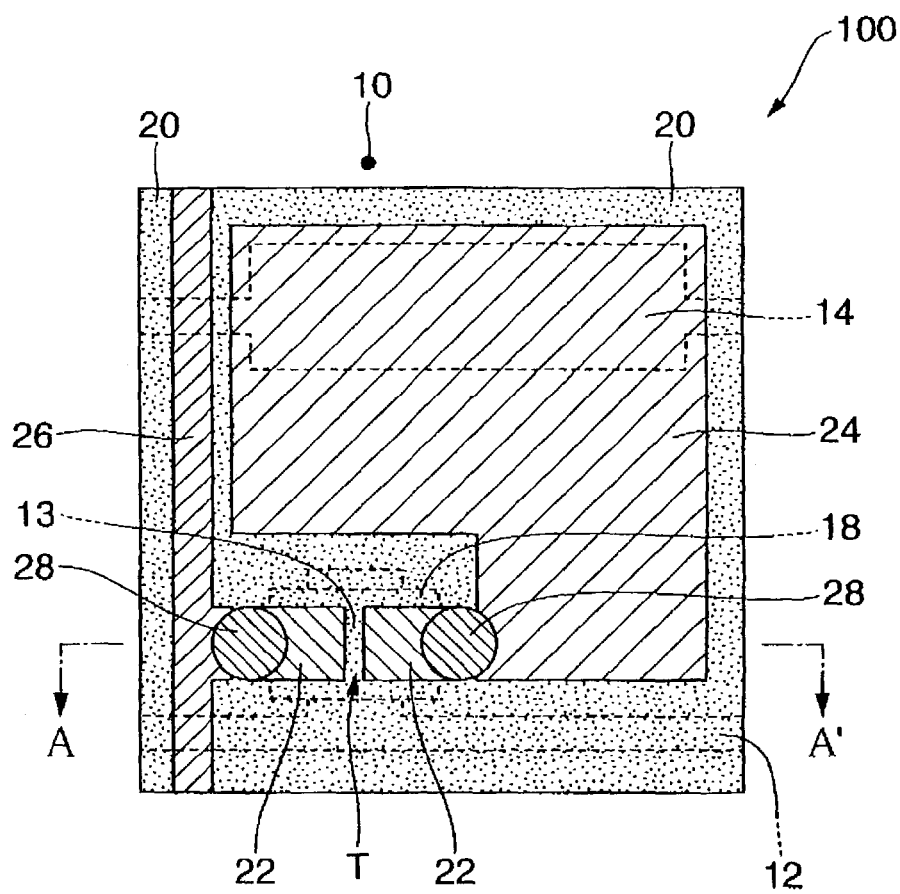
FIGS. 3a and 3b are views showing a specific structure of a pixel portion.
Figure 3:
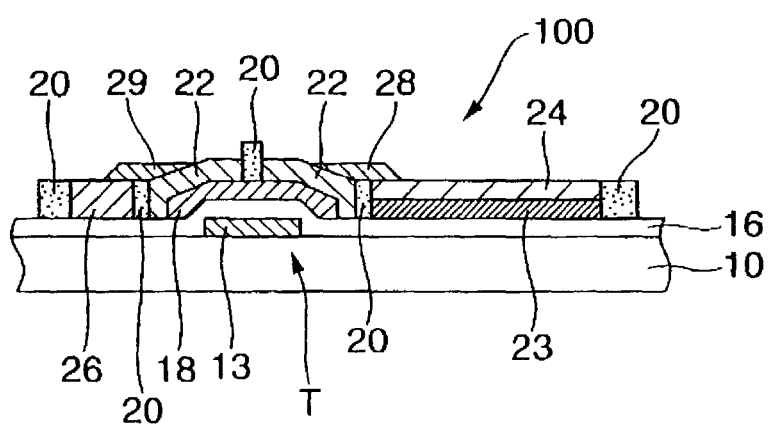

Next, a specific structure of the pixel portion 100 shown in FIG. 2 will be described. FIG. 3 illustrates a specific structure of the pixel portion in the liquid crystal display device of this embodiment. FIG. 3(a) is a plan view in which one pixel portion 100 is the focus, and FIG. 3(b) is a cross-sectional view taken along a line A–A' shown in FIG. 3(a).

As shown in FIG. 3, the thin film transistor T of this embodiment has a so-called inversely staggered type structure, and comprises a gate electrode 13 formed on the glass substrate 10, a gate insulating film 16 formed on the gate electrode 13, a channel region 18 formed on the gate insulating film 16, and source/drain regions 22 formed on the channel region 18.

Further, the pixel portion 100 of the liquid crystal display device comprises the aforementioned thin film transistor T, the scanning line (gate line) 12, the capacitor line 14, a color filter 23, the pixel electrode 24 and the data line (source line) 26, respectively. In this embodiment, the color filter 23 and the pixel electrode 24 are formed to overlap each other in the same region on the glass substrate 10, and they define a pixel region. Furthermore, the gate electrode 13 of the thin film transistor T is formed integrally with the gate line 12. A method of forming the gate line 12 and the gate electrode 13 will be described later.

One source/drain region 22 is electrically connected to the pixel electrode 24 through a connecting portion 28. The pixel electrode 24 applies voltage to the liquid crystal LC. Further, the other source/drain region 22 is electrically connected to the data line 26 through a connecting portion 29. The capacitor line 14 is involved in forming the aforementioned storage capacitor 60 (a capacitor for more stably holding the charges in the liquid crystal layer) and is formed below the pixel electrode 24.

Furthermore, a wall (bank) made of a polyimide film 20 is formed to surround the respective peripheries of the source/drain regions 22, the color filter 23, the pixel electrode 24 and the data line 26. The polyimide film 20 is used in forming the source/drain regions 22, the color filter 23, the pixel electrode 24 and the data line 26, respectively, and the details thereof will be described later.

An array substrate is constructed by forming the pixel portions 100 on the glass substrate 10 in a matrix shape. Then, by performing a surface treatment such as the formation of an oriented film to the array substrate and the counter substrate having a counter electrode 50 formed on one surface thereof, bonding both of them together, injecting the liquid crystal material between the array substrate and the counter substrate, and providing the driving circuit or the backlight, a liquid crystal display device is formed. A specific example of the liquid crystal display device will be described later.

Now, a method of manufacturing the thin film transistor of this embodiment and a pixel circuit comprising the thin film transistor will be described in detail. FIGS. 4 to 10 are explanatory views illustrating the manufacturing method of this embodiment.

Process for Forming Gate Line, Gate Electrode and Capacitor Line

Figure 4:
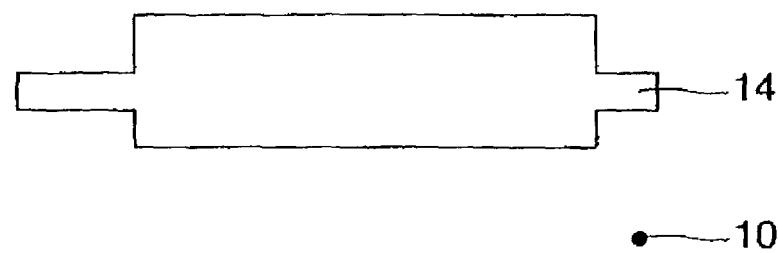
FIGS. 4a and 4b are explanatory views for explaining a manufacturing method according to an embodiment of the present invention.
Figure 4:
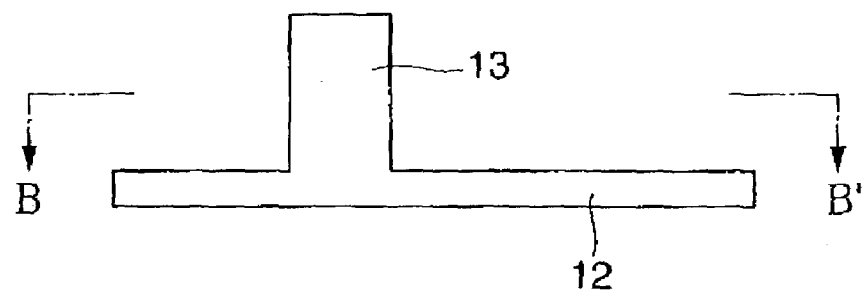
Figure 4:
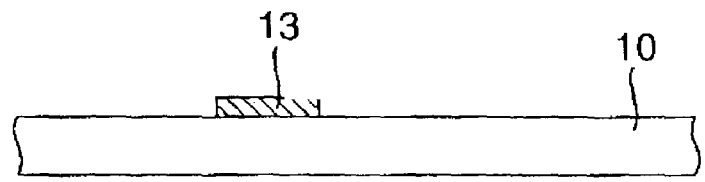

FIG. 4 illustrates a process for forming a gate line, a gate electrode and a capacitor line. FIG. 4(a) is a plan view of the glass substrate 10 as seen from the upper side, and FIG. 4(b) is a cross-sectional view taken along a line B–B' shown in FIG. 4(a).

As shown in FIG. 4(a), the gate line 12 and the gate electrode 13 are formed integrally and the capacitor line 14 is formed in predetermined positions on the glass substrate 10, by the droplet ejection method. Specifically, the upper surface of the glass substrate 10 has a certain degree of a uniform lyophobic property. Next, a solution containing conductive fine particles is ejected onto the upper surface of the glass substrate 10 to draw each of the gate line 12, the gate electrode 13 and the capacitor line 14. Thereafter, the glass substrate 10 applied with the solution is subjected to heat treatment, and as a result the gate line 12, the gate electrode 13 and the capacitor line 14 are formed.

Here, as the conductive fine particles, metallic fine particles containing any one of gold, silver, copper, palladium and nickel or fine particles of conductive polymer or superconductor can be considered. In this embodiment, a solution generated by dispersing these conductive fine particles in an organic solvent is employed. In order to disperse the fine particles, the surfaces of the fine particles may be coated with organic materials. Furthermore, in applying the materials to the substrate, it is preferable that the particle diameter is 0.1 µm or less for facilitating the dispersion into the solvent and applying the droplet ejection method.

For example, if using a solution formed by diluting a paste (using α-terpineol as a dispersing solvent) containing silver particles having a particle diameter of about 0.01 µm with toluene to cause its viscosity to be about 8 cP, it is possible to form the gate line 12 and the gate electrode 13 having a width of 20 µm, a thickness of 0.5 µm and a resistivity of 2 µΩcm.

Further, the ejection of solution may be carried out after forming the wall (bank) surrounding the periphery of the forming region of the gate line 12, or the ejection of solution may be carried out after performing a lyophilic treatment to the forming regions of the gate line 12 in addition to performing a lyophobic treatment to the upper surface of the glass substrate 10. By these methods, the diffusion of a solution applied to the forming region of the gate line 12 can be suppressed, so that the shape of the gate line 12 or the like can be formed more accurately.

Furthermore, the gate line 12 may be formed by forming a film on the whole upper surface of the glass substrate 10 through a vapor deposition method such as a general sputtering method, a plasma enhanced chemical vapor deposition (PECVD) method or a low pressure chemical vapor deposition (LPCVD) method and then patterning the film.

Process for Forming Gate Insulating Film and Amorphous Silicon Film

Figure 5:
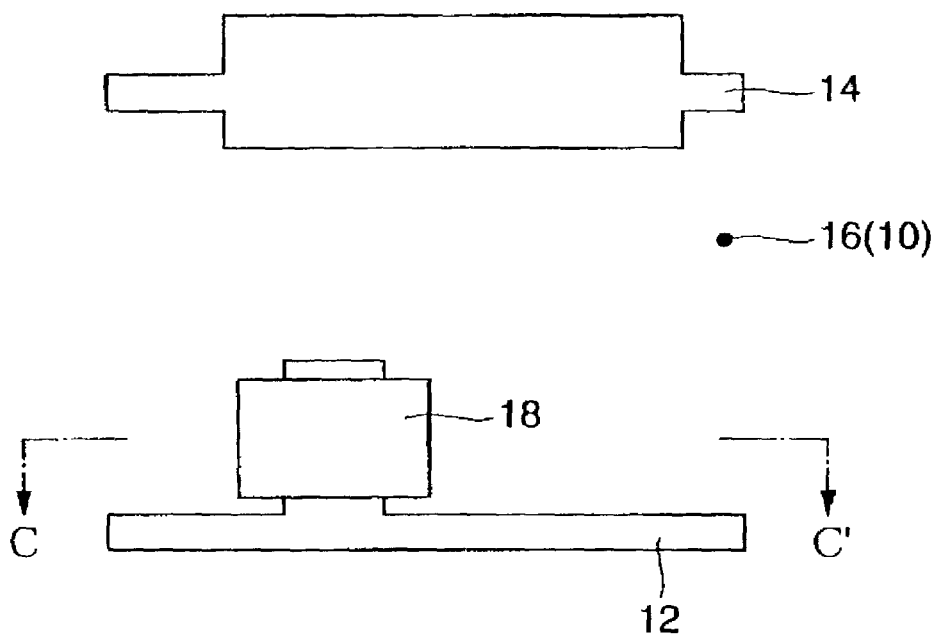
FIGS. 5a and 5b are explanatory views for explaining a method according to an embodiment of the present invention.
Figure 5:
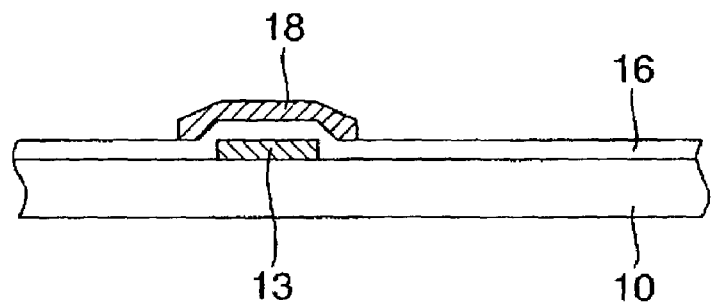

FIG. 5 illustrates a process for forming a gate insulating film and an amorphous silicon film. FIG. 5(a) is a plan view of the glass substrate 10 as seen from the upper side, and FIG. 5(b) is a cross-sectional view taken along a line C–C' shown in FIG. 5(a).

As shown in FIG. 5, the gate insulating film 16 is formed on the whole upper surface of the glass substrate 10 so as to cover the glass substrate 10, the gate line 12, the gate electrode 13 and the capacitor line 14, respectively. It is preferable that the gate insulating film 16 is formed from a silicon nitride ($SiN_x$) film by the PECVD method. Further, the gate insulating film 16 may be formed as a bilayer structured film deposited to overlap silicon nitride and silicon oxide ($SiO_2$) In this case, it is preferable that the film formation is carried out using a so-called continuous CVD method which continuously forms plural types of films while changing reaction gas during the film formation in the CVD method.

Next, the channel region 18 made of an amorphous silicon film is formed at a predetermined position on the gate insulating film 16. Specifically, the channel region 18 is formed in an island shape (isolatedly) on the gate electrode 13 as shown in FIG. 5(a), by forming the amorphous silicon film on the whole upper surface of the glass substrate 10 through a the vapor deposition method such as the PECVD method and then patterning the film into a desired shape. Furthermore, it is preferable that the formation of the amorphous silicon film on the glass substrate 10 is carried out successively after the formation of the aforementioned gate insulating film 16 by using the continuous CVD method.

Process for Forming Bank Made of Polyimide Film

Figure 6:
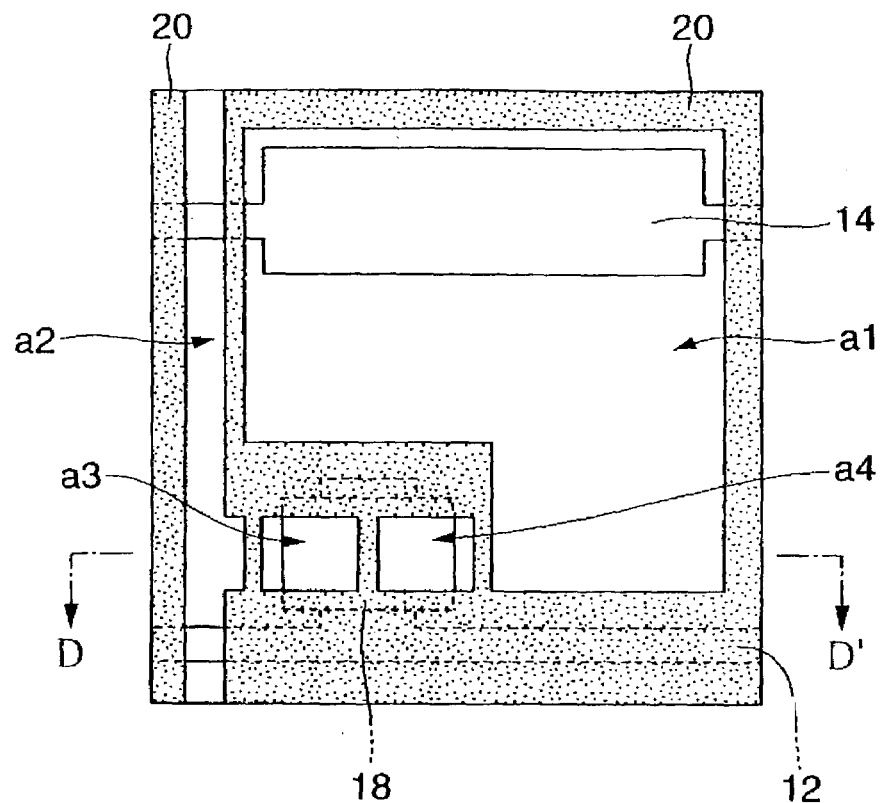
FIGS. 6a and 6b are explanatory views for explaining a method according to an embodiment of the present invention.
Figure 6:
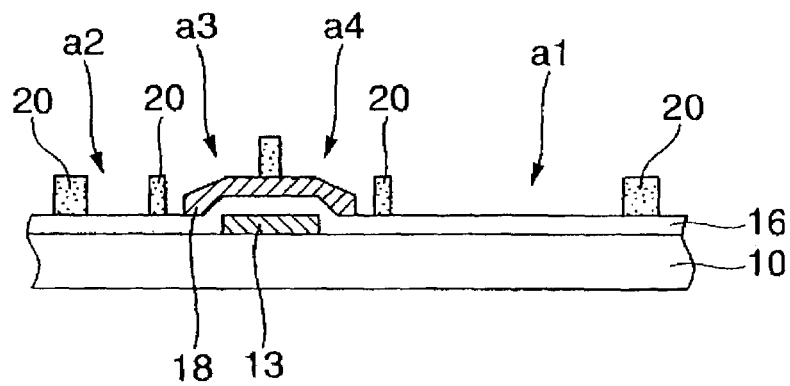

FIG. 6 illustrates a process for forming a bank (wall) made of a polyimide film. FIG. 6(a) is a plan view of the glass substrate 10 as seen from the upper side, and FIG. 6(b) is a cross-sectional view taken along a line D–D' shown in FIG. 6(a).

As shown in FIG. 6, a polyimide film 20 having predetermined shapes of openings a1, a2, a3, and a4 is formed on the upper surface of the glass substrate 10. Specifically, the opening a1 provided in the polyimide film 20 is formed to expose a region (pixel region) in which the color filter 23 and the pixel electrode 24 should be formed in the subsequent process.

Accordingly, a bank made of the polyimide film 20 is formed on the periphery of a forming region of the color filter 23 and the pixel electrode 24.

The opening a2 is formed to expose the region in which the data line 26 should be formed in the subsequent process. Accordingly, the bank made of the polyimide film 20 is formed on the periphery of the forming region of the data line 26. Similarly, the openings a3 and a4 are formed to expose regions in which the source/drain 22 of the thin film transistor T should be formed in the subsequent process. Accordingly, the banks made of the polyimide film 20 are formed on the peripheries of forming regions of the source/drain regions 22.

The polyimide film 20 may be formed, for example, by applying a photosensitive polyimide solvent to the whole upper surface of the glass substrate 10, drying it, removing (when the polyimide solvent is positive type) the respective regions corresponding to the openings a1 to a4 through the exposure and development thereof, and then baking it at a temperature of about 300° C. to 400° C. Furthermore, it is preferable that the polyimide film 20 is formed to be about 0.5 to 10 μm thick.

Process for Forming Source/Drain Regions

Figure 7:
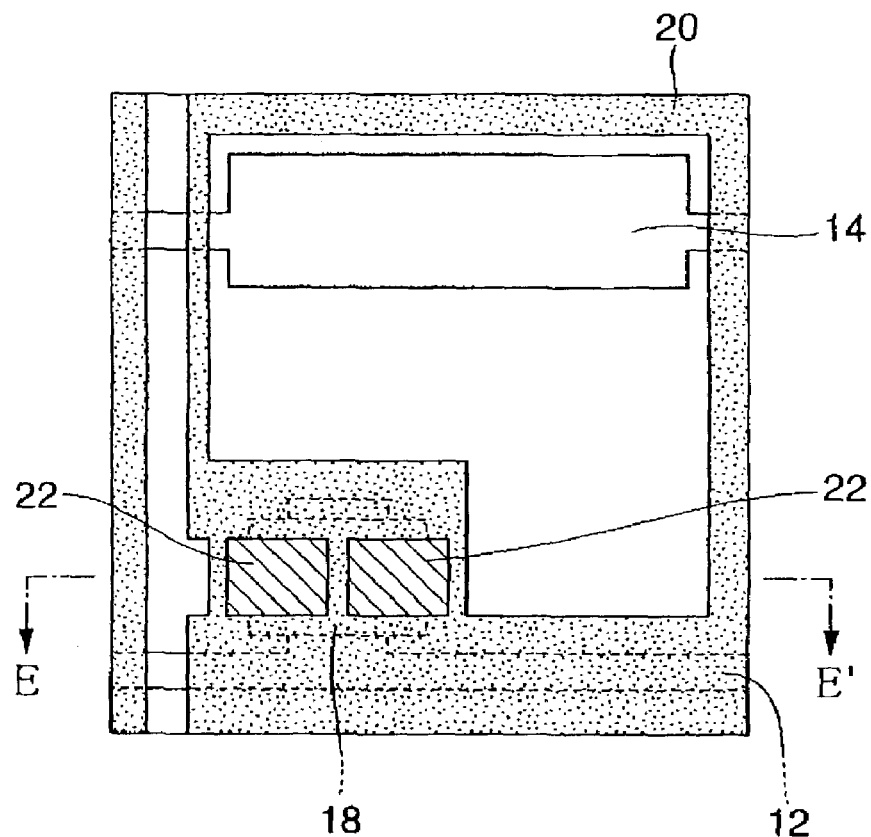
FIGS. 7a and 7b are explanatory views for explaining a method according to an embodiment of the present invention.
Figure 7:
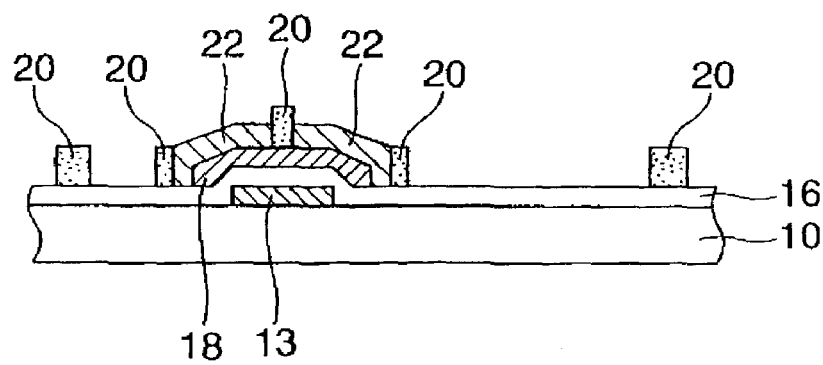

FIG. 7 illustrates a process for forming source/drain regions. FIG. 7(a) is a plan view of the glass substrate 10 as seen from the upper side, and FIG. 7(b) is a cross-sectional view taken along a line E–E' shown in FIG. 7(a), As shown in FIG. 7, source/drain regions 22 made of an amorphous silicon film into which dopants have been heavily doped are formed in the openings a3 and a4 (See FIG. 6) provided in the polyimide film 20. In this embodiment, the source/drain regions 22 are formed by the droplet ejection method.

Specifically, first, a solution containing a silicon compound of which materials containing a Group V element such as phosphor or a Group III element such as boron is doped as a dopant source, or a solution containing a silicon compound denatured into such elements (phosphor or boron) and a silicon compound not denatured is ejected from the droplet ejecting head to fill in the openings a3 and a4. Hereinafter, the solution containing such silicon compound is referred to as "a silicon solution".

Next, the silicon solution filled in the respective openings a3, a4 are dried and then baked at a temperature of about 300° C. to 400° C. A series of such treatments are carried out in an atmosphere of inert gas such as nitrogen. By doing so, the source/drain regions 22, made of the amorphous silicon film into which dopants (donor or acceptor) are doped heavily, are formed in the openings a3 and a4 of which the peripheries are surrounded with the bank made of the polyimide film 20.

Here, it is preferable that a high-order silane photopolymerized by irradiating ultraviolet rays onto something having one or more ring-shaped structures such as cyclopentasilane ($Si_5H_{10}$) is used as the aforementioned silicon compound. In this case, it is more preferable that the silane compound is formed by irradiating the UV ray onto a mixture of a phosphor compound and a boron compound and gathering it during the polymerization thereof. Further, the solvent for preparing the silicon solution is not specifically limited provided that it dissolves the silicon compound and it does not react with the compound, but in general, it is preferable that its vapor pressure at room temperature is 0.001 to 200 mmHg. A specific example of the solvent may include a hydrocarbon group solvent such as benzene or toluene.

Furthermore, it is more preferable that before ejecting the silicon solution from the droplet ejection head, the insides of the openings a3 and a4 becomes lyophilic and the peripheries thereof becomes lyophobic. The lyophilic and lyophobic treatment can be realized by processing the whole glass substrate 10 with the oxygen plasma in the atmosphere plasma to be lyophilic and subsequently by processing it with $CF_4$ plasma so that only the polyimide film 20 becomes lyophobic.

Process for Forming Data Line

Figure 8:
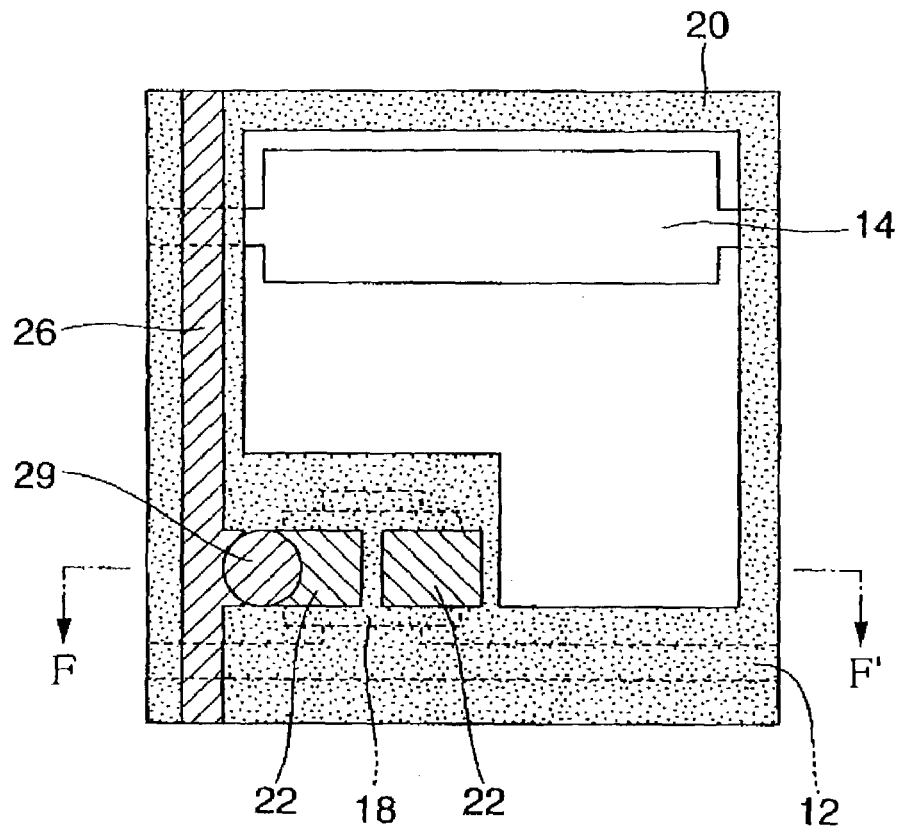
FIGS. 8a and 8b are explanatory views for explaining a method according to an embodiment of the present invention.
Figure 8:
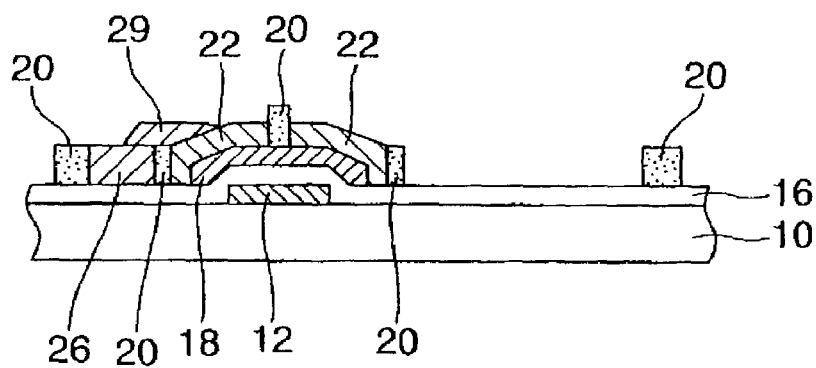

FIG. 8 illustrates a process for forming the data line. FIG. 8(a) is a plan view of the glass substrate 10 as seen from the upper side, and FIG. 8(b) is a cross-sectional view taken along a line F–F' shown in FIG. 8(a).

As shown in FIG. 8, the data line 26 is formed inside the opening a2 (See FIG. 6) provided in the polyimide film 20. In this embodiment, the data line 26 is also formed by using the droplet ejection method. Specifically, a solution formed by dispersing the metallic ultrafine particles similar to those used in forming the aforementioned gate line 12 in an organic solvent is ejected from the droplet ejection head to fill in the opening a2, and then a drying treatment and a heat treatment are carried out (for example, for 30 minutes at 300° C.). As a result, the data line 26 is formed inside the opening a2 of which the periphery is surrounded with the polyimide film 20.

Furthermore, a connecting portion 29 for establishing the electrical connection between the source/drain regions 22 and the data line 26 is formed by using the aforementioned solution containing the metal micro-particles in addition to the formation of the data line 26. As shown in FIG. 8, the connecting portion 28 is formed so as to extend over the bank made of the polyimide film 20 between the source/drain regions 22 and the data line 26.

Process for Forming Color Filter and Pixel Electrode

Figure 9:
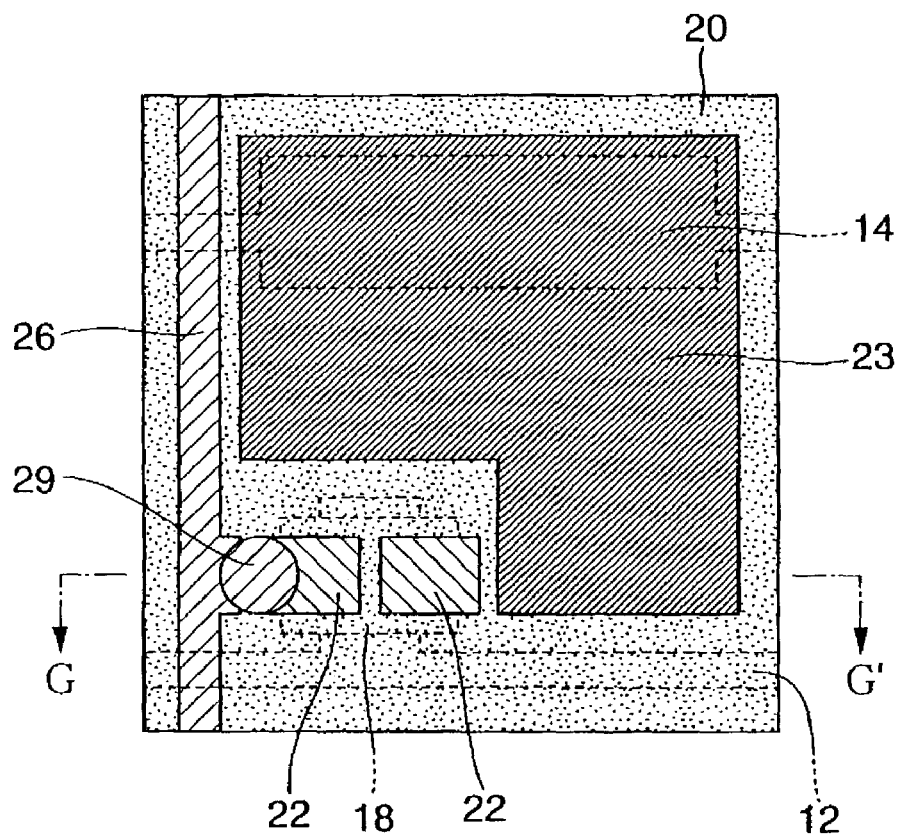
FIGS. 9a and 9b are explanatory views for explaining a method according to an embodiment of the present invention.
Figure 9:
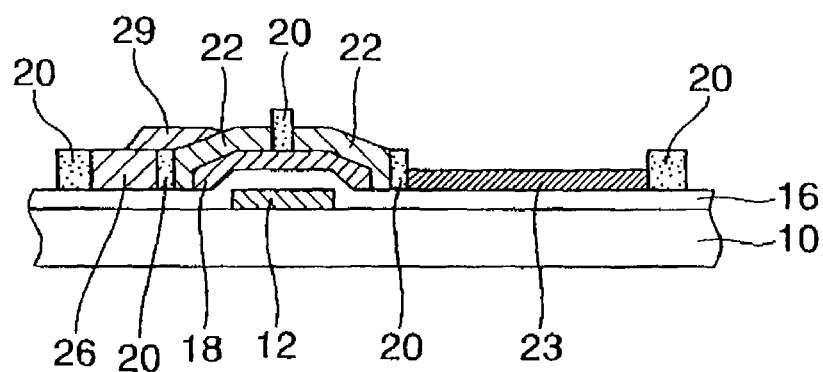

FIG. 9 illustrates a process for forming a color filter. FIG. 9(a) is a plan view of the glass substrate 10 as seen from the upper side, and FIG. 9(b) is a cross-sectional view taken along a line G–G' shown in FIG. 9(a).

As shown in FIG. 9, the color filter 23 is formed inside the opening a1 (see FIG. 6) provided in the polyimide film 20. In this embodiment, the color filter 23 is also formed by the droplet ejection method. Specifically, a resin composition for the color filter is ejected from the droplet ejection head to fill in the opening a1 and then a drying treatment and a heat treatment are carried out. As a result, the color filter 23 is formed inside the opening a1 of which the periphery is surrounded with the bank made of the polyimide film 20.

Figure 10:
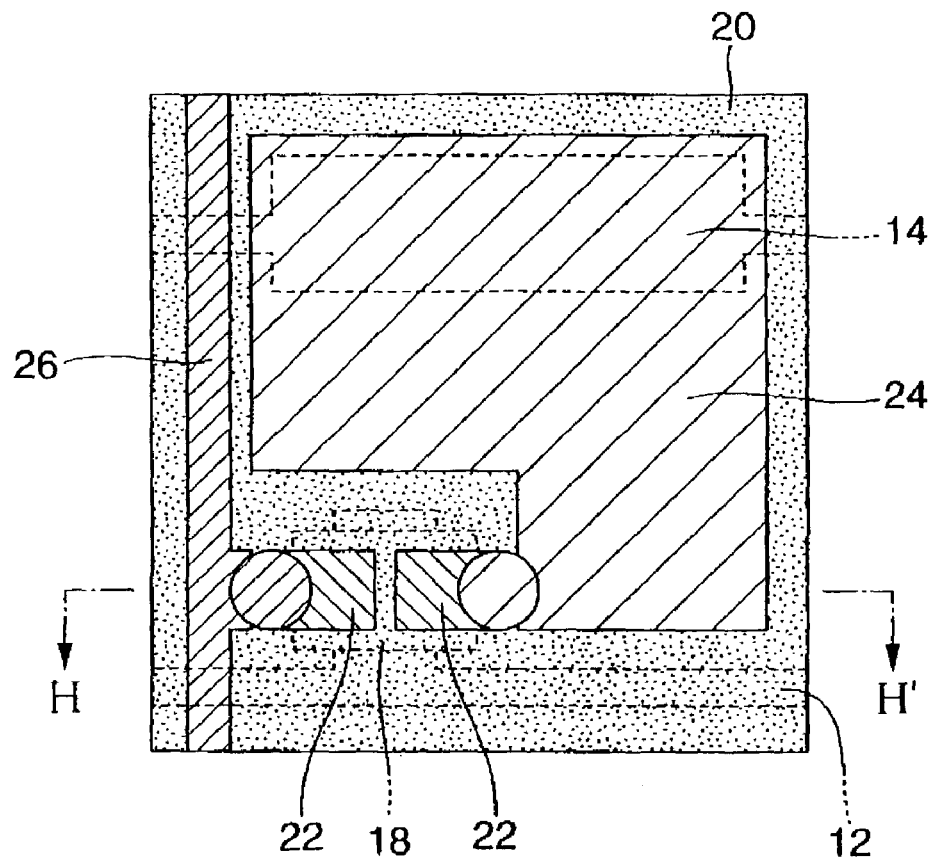
FIGS. 10a and 10b are explanatory views for explaining a method according to an embodiment of the present invention.
Figure 10:
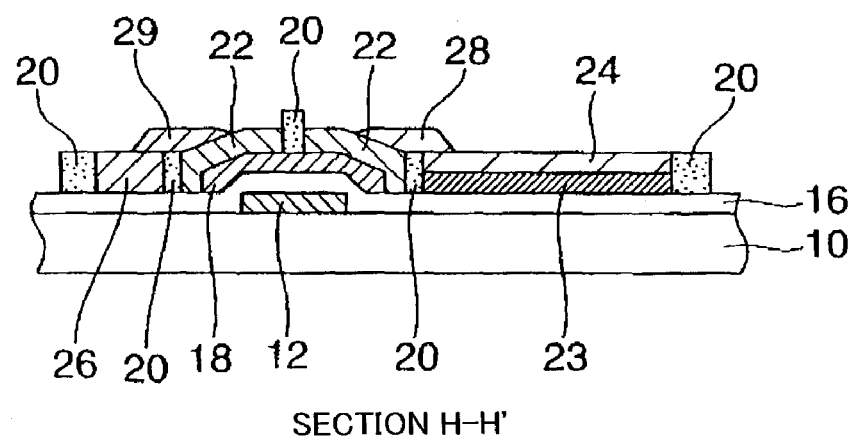

Next, the pixel electrode 24 is formed on the color filter 23. FIG. 10 illustrates a process for forming the pixel electrode. FIG. 10(a) is a plan view of the glass substrate 10 as seen from the upper side, and FIG. 10(b) is a cross-sectional view taken along a line H–H' shown in FIG. 10(a).

As shown in FIG. 10, the pixel electrode 24 made of an ITO (Indium Tin Oxide) film is formed on the color filter 23 previously formed inside the opening a1 (See FIG. 6) provided in the polyimide film 20. In this embodiment, the pixel electrode 24 is also formed by the droplet ejection method. Specifically, the application-type ITO solution is ejected from the droplet ejection head to fill in the opening a1, and then a drying treatment and a heat treatment are carried out. As a result, the pixel electrode 24 is formed inside the opening a1 of which the periphery is surrounded with the bank made of the polyimide film 20.

For example, by filling in the opening a1 with a general application-type ITO solution, drying it in an air atmosphere at 160° C. for 5 minutes and then carrying out the heat treatment in the air atmosphere at 250° C. for 60 minutes, the pixel electrode 24 having a thickness of about 1500 Å can be formed.

Furthermore, the connecting portion 28 for establishing the electrical connection between the source/drain regions 22 and the pixel electrode 24 is formed by using the aforementioned ITO applying solution in addition to the formation of the pixel electrode 24. As shown in FIG. 10, the connecting portion 28 is formed so as to extend over the bank made of the polyimide film 20 between the source/drain regions 22 and the pixel electrode 24. Consequently, the thin film transistor T of this embodiment shown in FIG. 3 and the pixel portion 100 comprising it are completed. Furthermore, a protective film made of a silicon oxide film may be formed on the upper surface of the pixel portion 100, if necessary.

As described above in the manufacturing method of this embodiment, by forming the polyimide film 20 which surrounds the peripheries of regions for some elements (color filter 23, pixel electrode 24, source/drain regions 22, and data line 26) of the liquid crystal display device and applying liquid materials to the regions surrounded with the wall made of the polyimide film 20, to form films, each element is formed. Accordingly, the number of execution steps of the conventional process for film formation, combining the vapor deposition method such as the CVD method or the sputtering method and the photolithography method, can be reduced to simplify the manufacturing processes, and thus the manufacturing time can be reduced. Furthermore, since the wall made of the polyimide film 20 is provided, it is possible to minimize the range to which the liquid material is applied, and as a result the utilization efficiency of raw material is excellent. Furthermore, since the number of etching processes are reduced, it is possible to reduce the amount of waste and thus to reduce the processing cost. Therefore, it is possible to reduce the manufacturing cost of the device.

Next, another embodiment for the formation process for the color filter and the pixel electrode will be described. In the aforementioned embodiment, the color filter was first formed and the pixel electrode was formed thereon to overlap the color filter. However, the pixel electrode may be first formed and then the color filter may be formed to overlap the pixel electrode in this embodiment. Now, the process for forming the color filter and the pixel electrode according to this embodiment will be described.

Figure 11:
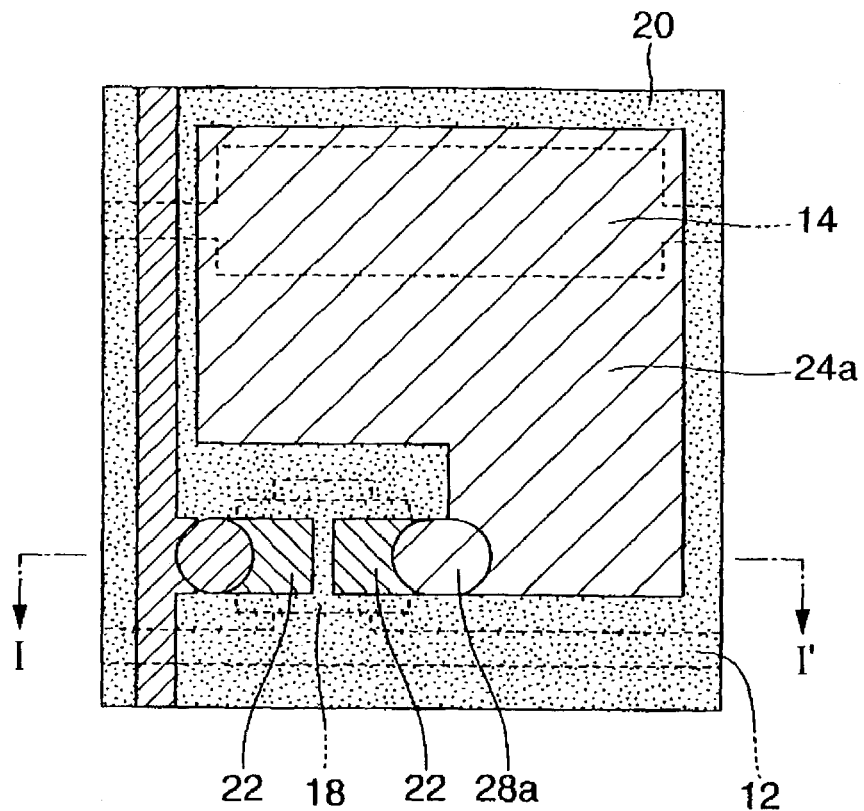
FIGS. 11a and 11b are explanatory views for explaining a forming process in which a pixel electrode is first formed and then a color filter is formed thereon.
Figure 11:
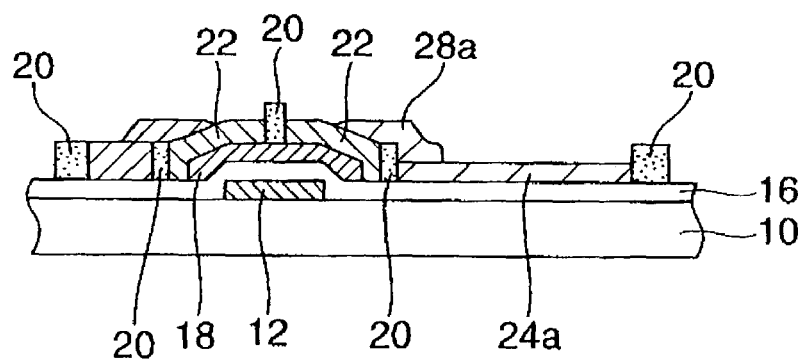
Figure 12:
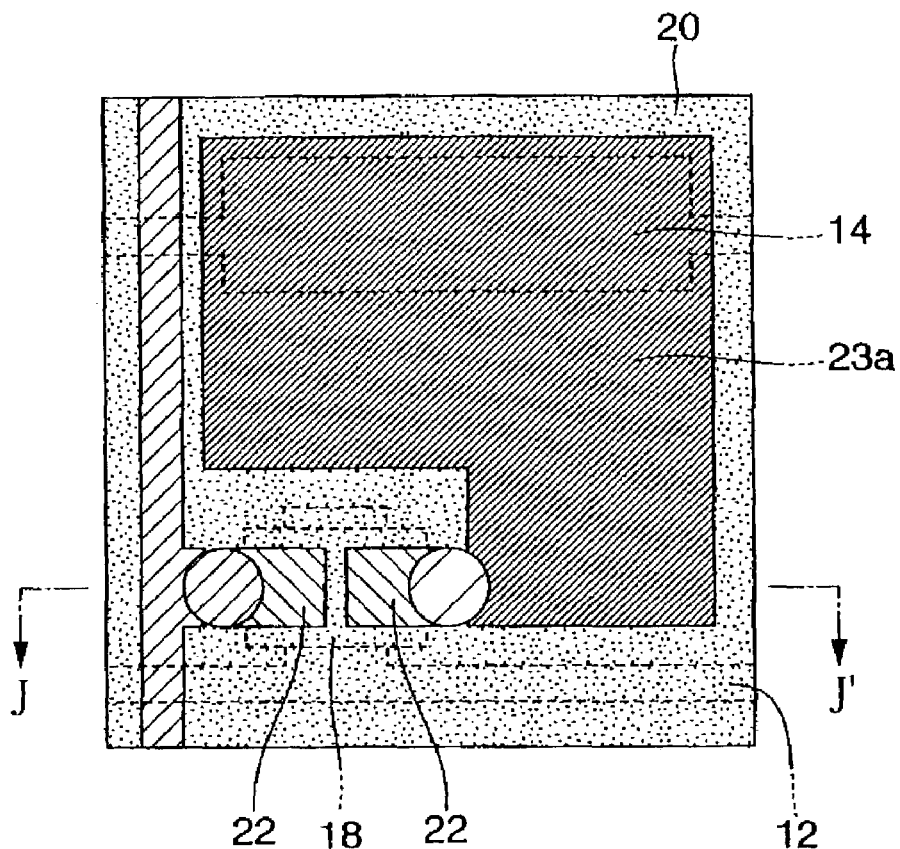
FIGS. 12a and 12b are explanatory views for explaining a forming process in which a pixel electrode is first formed and then a color filter is formed thereon.
Figure 12:
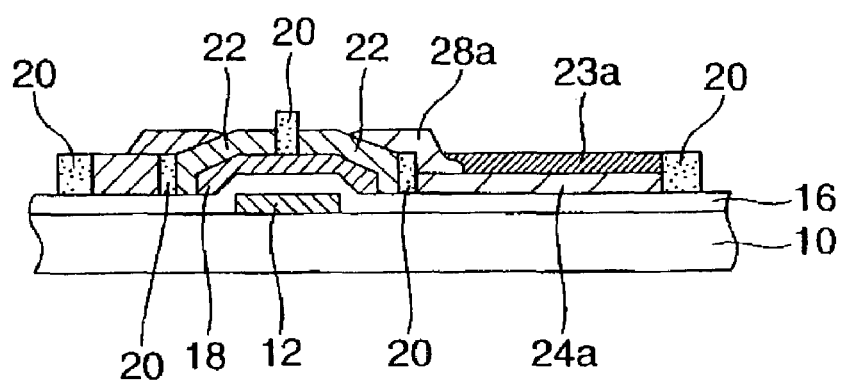

FIGS. 11 and 12 illustrate the forming process when the pixel electrode is first formed and then the color filter is formed thereon. FIG. 11 illustrates the process for forming the pixel electrode where FIG. 11(a) is a plan view of the glass substrate 10 as seen from the upper side, and FIG. 11(b) is a cross-sectional view taken along a line I–I' shown in FIG. 11(a).

As shown in FIG. 11, a pixel electrode 24a made of an ITO (Indium Tin Oxide) film is formed inside the opening a1 (See FIG. 6) provided in the polyimide film 20 by using the droplet ejection method. Specifically, an application-type ITO solution is ejected from the droplet ejection head to fill in the opening a1, and then a drying treatment and a heat treatment are carried out. As a result, the pixel electrode 24a is formed inside the opening a1 of which the periphery is surrounded with the bank made of the polyimide film 20. Furthermore, the connecting portion 28a for establishing the electrical connection between the source/drain regions 22 and the pixel electrode 24a is formed by using the application-type ITO solution in addition to the formation of the pixel electrode 24a. As shown in FIG. 11, a connecting portion 29a is formed so as to extend over the bank made of the polyimide film 20 between the source/drain regions 22 and the pixel electrode 24a.

Next, a color filter is formed on the pixel electrode 24a. FIG. 12 illustrates the process for forming the color filter where FIG. 12(a) is a plan view of the glass substrate 10 as seen from the upper side, and FIG. 12(b) is a cross-sectional view taken along a line J–J' shown in FIG. 12(a).

As shown in FIG. 12, a color filter 23a is formed on the pixel electrode 24a inside the opening a1 (see FIG. 6) provided in the polyimide film 20 by using the droplet ejection method. Specifically, a resin composition for color filter is ejected from the droplet ejection head to fill in the opening a1, and then a drying treatment and a heat treatment are carried out. As a result, the color filter 23a is formed inside the opening a1 of which the periphery is surrounded with the bank made of the polyimide film 20.

Furthermore, although a pixel region is formed by forming the color filter and the pixel electrode which overlap each other, in the aforementioned embodiment, the pixel region may be formed as an integral functional film having functions of both the color filter (CF) and the pixel electrode. Furthermore, hereinafter, the functional film having functions of both the color filter and the pixel electrode is referred to as a "CF/pixel electrode". Now, the process for forming the CF/pixel electrode in this embodiment will be described.

Figure 13:
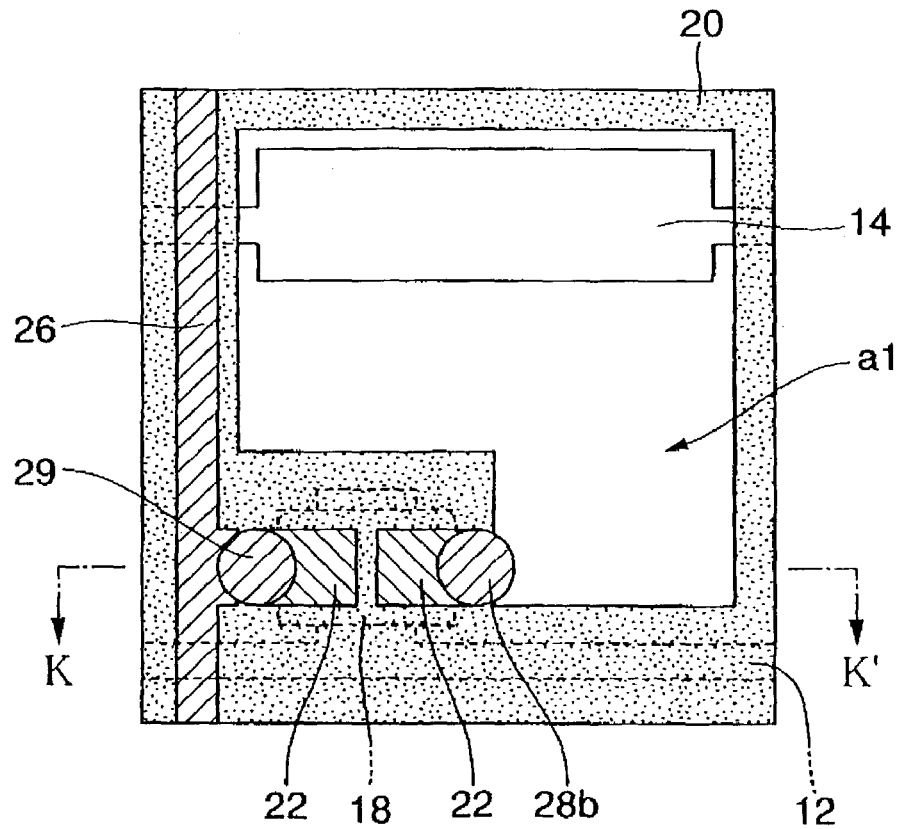
FIGS. 13a and 13b are explanatory views for explaining a forming process in which a pixel electrode (CF/pixel electrode), having the function of a color filter, is formed.
Figure 13:
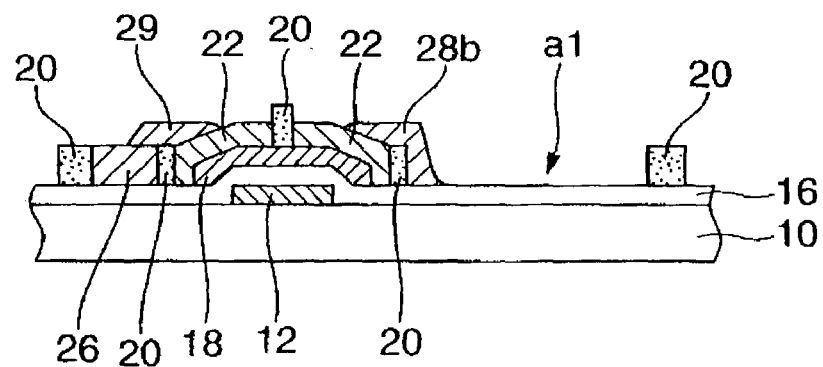
Figure 14:
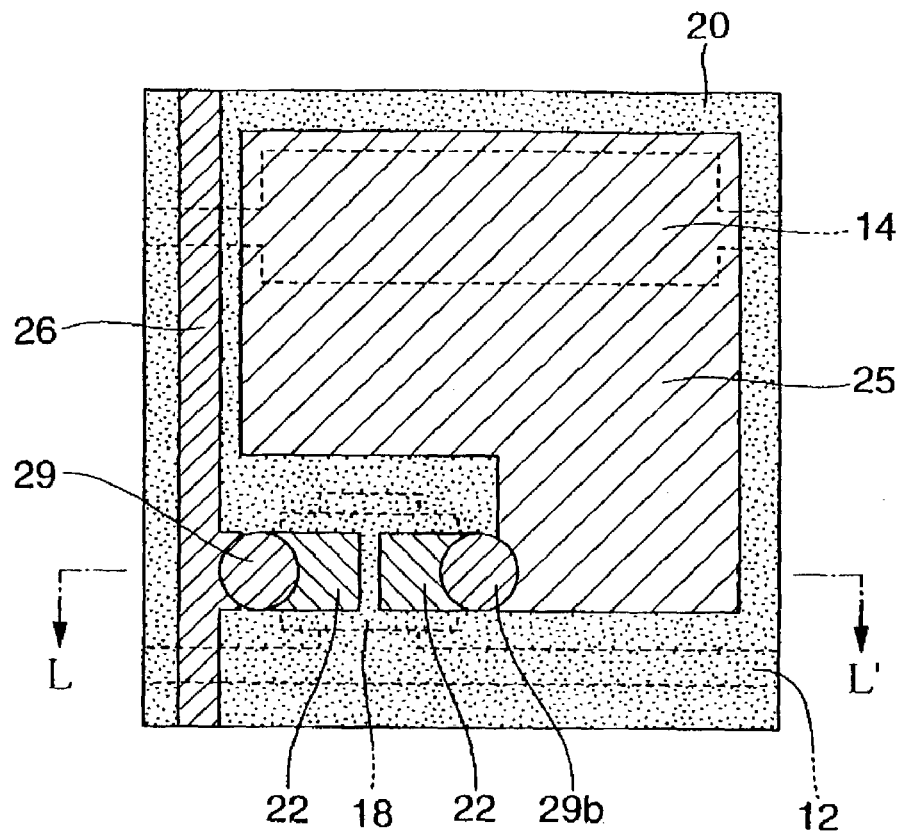
FIGS. 14a and 14b are explanatory views for explaining a forming process in which a pixel electrode (CF/pixel electrode), having the function of a color filter, is formed.
Figure 14:
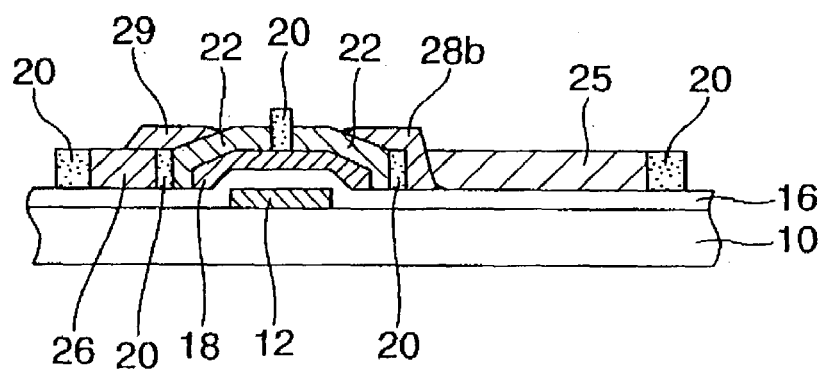

FIGS. 13 and 14 illustrate a forming process when the pixel electrode (CF/pixel electrode) having the function of the color filter is formed. FIG. 13 illustrates a process for forming a connecting portion for electrically connecting the source/drain regions and the CF/pixel electrode where FIG. 13(a) is a plan view of the glass substrate 10 as seen from the upper side, and FIG. 13(b) is a cross-sectional view taken along a line K–K' shown in FIG. 13(a).

As shown in FIG. 13, a connecting portion 28b for establishing the electrical connection between the source/drain regions 22 and the CF/pixel electrode to be formed inside the opening a1 later is formed by using the solution containing the metallic fine particles. As shown in FIG. 13, the connecting portion 28b is formed so as to extend over a bank made of the polyimide film 20 between the source/drain regions 22 and the opening a1. The formation of this connecting portion 28b should be carried out in the same process as the forming process for the data line 26 and the connecting portion 29 which is carried out using the solution containing the metallic fine particles.

Next, a CF/pixel electrode is formed inside the opening a1. FIG. 14 illustrates a process for forming the CF/pixel electrode where FIG. 14(a) is a plan view of the glass substrate 10 as seen from the upper side, and FIG. 14(b) is a cross-sectional view taken along a line L–L' shown in FIG. 14(a).

As shown in FIG. 14, a CF/pixel electrode 25 is formed inside the opening a1 provided in the polyimide film 20 by using the droplet ejection method. Specifically, a solution prepared by mixing various types of dyes or pigments, or coloring materials such as conductive color resist with the ITO applying solution is ejected from the droplet ejection head to fill in the opening a1, and then a drying treatment and a heat treatment are carried out. As a result, the CF/pixel electrode 25 is formed inside the opening a1 of which the periphery is surrounded with a bank made of the polyimide film 20.

Furthermore, the formation of the connecting portion 28b and that of the CF/pixel electrode 25 may be carried out inversely. In this case, after the CF/pixel electrode 25 is formed inside the opening a1, a connecting portion 29b for electrically connecting the source/drain regions 22 and the CF/pixel electrode 25 may be formed so as to extend over the bank made of the polyimide film 20, similar to the connecting portion 29 shown in FIG. 10. Furthermore, although the color filter and the pixel electrode have been formed after the data line has been formed, in the aforementioned embodiments, these formations may be carried out in reverse order.

Furthermore, in the aforementioned embodiments, although the amorphous silicon film for forming the channel region 18 of the thin film transistor T has been formed by using the vapor deposition method such as the PECVD method, it may be formed by using the droplet ejection method.

Figure 15:
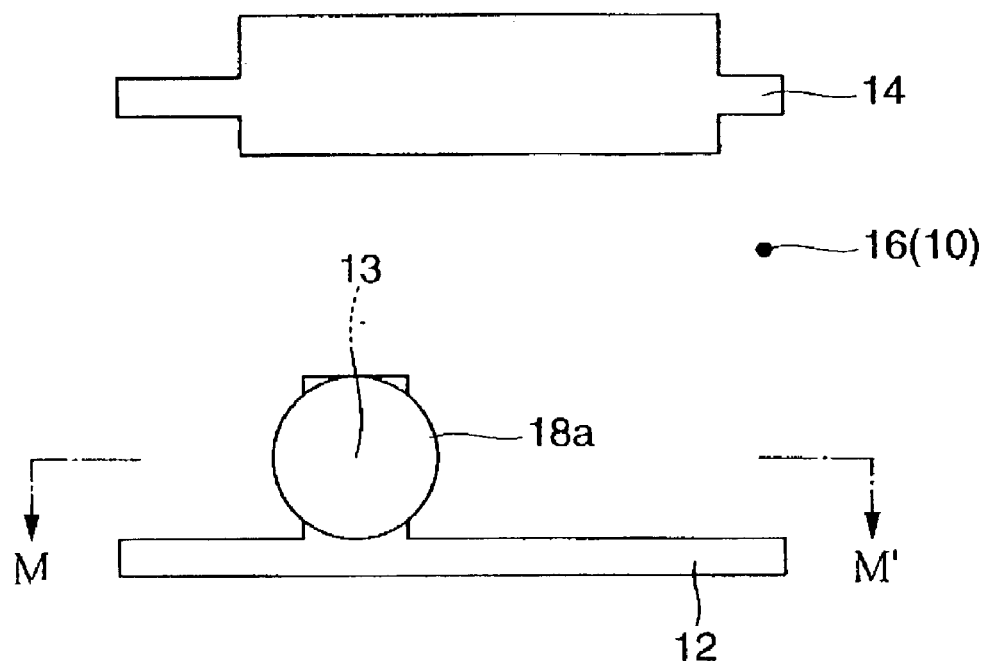
FIGS. 15a and 15b are views illustrating a process for forming an amorphous silicon film by using the droplet ejection method.
Figure 15:
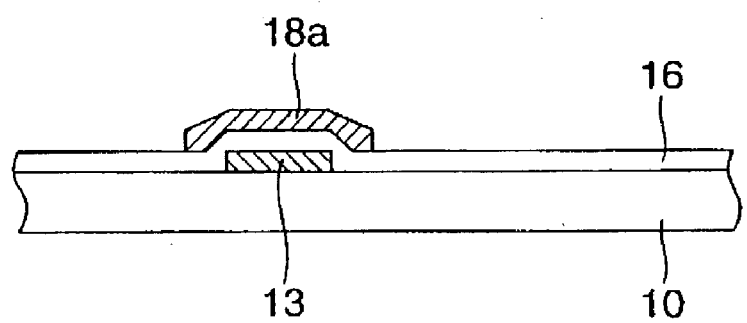

FIG. 15 illustrates a process for forming the amorphous silicon film through the dopant ejection method where FIG. 15(a) is a plan view of the glass substrate 10 as seen from the upper side, and FIG. 15(b) is a cross-sectional view taken along a line M–M' shown in FIG. 15(a).

Similar to the aforementioned embodiments, the gate insulating film 16 is formed on the whole upper surface of the glass substrate 10 so as to cover the gate line 12, the gate electrode 13, and the capacitor line 14, respectively (See FIG. 5). Next, the glass substrate 10 on which the gate insulating film 16 has been formed is introduced into a nitrogen atmosphere.

Next, by using the droplet ejection head, the silicon solution (solution containing silicon compound) is ejected to a range in which the channel region should be formed. It is preferable that the silicon solution contains the same silicon compound as that used in forming the aforementioned source/drain regions but should not contain the dopant source made of the Group V element such as phosphor or the Group III element such as boron.

Thereafter, by drying the ejected silicon solution and baking it at a temperature of about 300° C. to 400° C., the channel region 18a having an island shape made of the amorphous silicon is formed at a predetermined position on the gate electrode 13 as shown in FIG. 15. The channel region 18a has a relatively low degree of dimensional accuracy. Even if the silicon solution ejected by the droplet ejection method is rather diffused, it does not matter. Furthermore, when the diffusion of solution exceeds an allowable range, it is possible to suppress the diffusion of silicon solution, by causing the whole surface of the substrate to be lyophobic, or by causing it to be lyophilic only within the range in which the channel region 18a should be formed, and by causing it to be lyophobic in a range other than the above range.

Figure 16:
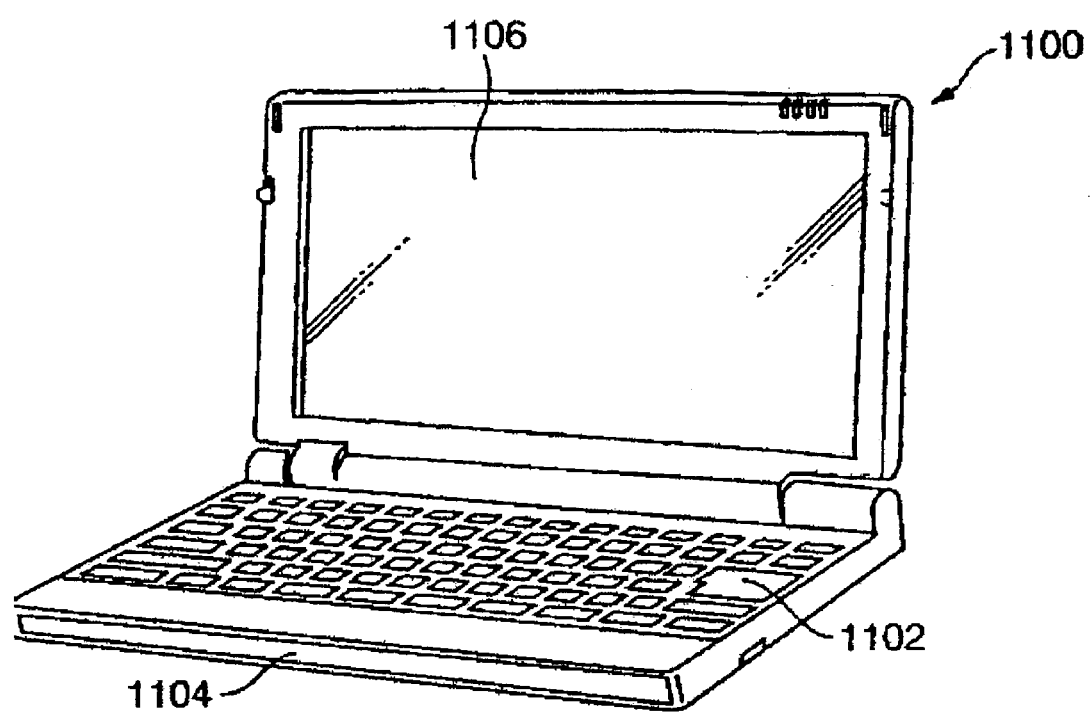
FIG. 16 is a perspective view showing an example in which the liquid crystal display device is applied to a mobile personal computer (information processing apparatus).

Next, an electronic apparatus including the liquid crystal display device according to the aforementioned embodiments will be described. FIG. 16 is a perspective view illustrating an example in which the liquid crystal display device according to this embodiment is applied to a mobile personal computer (information processing apparatus). In the drawing, the personal computer 1100 comprises a main body 1104 which includes a keyboard 1102 and a liquid crystal display device 1106 according to this embodiment. The manufacturing method according to this embodiment is particularly suitable for manufacturing the liquid crystal display device of which the screen size is large as shown in FIG. 16.

Furthermore, the electronic apparatus comprising the liquid crystal display device of this embodiment may include, in addition to the personal computer shown in FIG. 16, various electronic apparatuses such as a digital still camera, an electronic book, an electronic paper, a liquid crystal television, a view finder-type of direct viewing videotape recorder, a car navigation apparatus, a pager, an electronic notebook, a calculator, a word processor, an engineering workstation, a television phone, a POS terminal, or an apparatus provided with a touch panel.

Effects of the Invention

As described above, according to the present invention, the number of execution steps of the conventional process for film formation, that combines the vapor deposition method such as the CVD method or the sputtering method with the photolithography method, can be reduced so as to simplify the manufacturing processes and thus potentially reduce the manufacturing time. Furthermore, since the partition wall is provided, it is possible to minimize the range to which the liquid material is applied, and as a result the utilization efficiency of raw material is excellent. Furthermore, since the number of etching processes are reduced, it is possible to reduce the amount of waste and thus reduce the processing cost. Therefore, it is possible to reduce the manufacturing cost of the device. Furthermore, through the application of the manufacturing method of the present invention, it is possible to reduce the cost of the device.

The entire disclosure of Japanese Patent Application No. 2002-119968 filed Apr. 22, 2002 is incorporated by reference.

What is claimed is:

1. A device comprising:
    a plurality of pixels, each of the plurality of pixels including a first electrode, a second electrode, and a semiconductor film that overlaps at least a part of the first electrode and at least a part of the second electrode;
    a wiring that supplies at least one of a current and a voltage to the first electrode; and
    an insulator wall having a first insulator wall portion formed between the first electrode and the wiring, the first insulator wall portion not overlapping the first or the second electrode.

2. The device according to claim 1, further comprising:
    a third electrode overlapping the first or the second electrode.

3. The device according to claim 1, further comprising:
    a pixel electrode electrically connected the second electrode; and
    a second insulator wall portion of the insulator wall formed between the second electrode and the pixel electrode.

4. A display apparatus comprising a device according to claim 1.

5. A device comprising:
a plurality of pixels, each of the plurality of pixels including a first electrode, a second electrode, and a semiconductor film that overlaps at least a part of the first electrode and at least a part of the second electrode;
a wiring that supplies at least one of a current and a voltage to the first electrode; and
an insulator wall having a first insulator wall portion and a second insulator wall portion, the first insulator wall portion being formed between the first electrode and the second electrode, the first insulator wall portion not overlapping the first or the second electrode, the second insulator wall portion being formed between the first electrode and the wiring.

6. The device according to claim 5, further comprising:
a connecting portion formed over the second insulator wall portion to electrically connect the first electrode and the wiring.

7. The device according to claim 5, further comprising:
a pixel electrode electrically connecting to the second electrode, the insulator wall including a third insulator wall portion, the third insulating wall portion being formed between the second electrode and the pixel electrode.

8. The device according to claim 7, further comprising:
a connecting portion formed over the third insulator wall portion to electrically connect the second electrode and the pixel electrode.

9. The device according to claim 7, further comprising:
a color filter overlapping at least a part of the pixel electrode.

10. A display apparatus comprising a device according to claim 5.

11. A device comprising:
a plurality of pixels, each of the plurality of pixels including a first electrode, a second electrode, and a semiconductor film that overlaps at least a part of the first electrode and at least a part of the second electrode;
a wiring that supplies at least one of a current and a voltage to the first electrode;
an insulator wall having a first insulator wall portion, the first insulator wall portion being formed between the first electrode and the wiring; and
a connecting portion formed over the first insulator wall portion to electrically connect the first electrode and the wiring.

12. A device comprising:
a plurality of pixels, each of the plurality of pixels including a first electrode, a second electrode, and a semiconductor film that overlaps at least a part of the first electrode and at least a apart of the second electrode;
a wiring that supplies at least one of a current and a voltage to the first electrode;
an insulator wall having a first insulator wall portion, the first insulator wall portion being formed between the first electrode and the wiring;
a connecting portion formed over the first insulator wall portion to electrically connect the first electrode and the wiring;
a pixel electrode electrically connected to the second electrode;
a second insulator wall portion of the insulator wall formed between the second electrode and the pixel electrode; and
a connecting portion formed over the second insulating wall portion to electrically connect the second electrode and the pixel electrode.

13. A device according to claim 12, further comprising a color filter overlapping at least a part of the pixel electrode.

* * * * *

UNITED STATES PATENT AND TRADEMARK OFFICE
CERTIFICATE OF CORRECTION

| | | |
|---|---|---|
| PATENT NO. | : 7,136,127 B2 | |
| APPLICATION NO. | : 10/420526 | |
| DATED | : October 24, 2006 | |
| INVENTOR(S) | : Watanabe et al. | |

It is certified that error appears in the above-identified patent and that said Letters Patent is hereby corrected as shown below:

ON THE TITLE PAGE [57] ABSTRACT:

Line 14, "formed" should read --are formed--.

COLUMN 2:

Line 10, "the wiring." should read --wirings.--;
Line 39, "is are" should read --is--; and
Line 61, "waver" should read --wave--.

COLUMN 3:

Line 55, "achieve" should read --achieved--;
Line 67, "an ray, a ray, a ray" should read --an α ray, a β ray, a γ ray--.

COLUMN 5:

Line 13, "schematic" should read --a schematic--.

COLUMN 6:

Line 22, "two-dimension" should read --two-dimensional--; and
Line 67, "versions" should read --version--.

COLUMN 9:

Line 10, "FIG. 2," should read --FIG. 1,--;
Line 16, "to" should read --for--;
Line 17, "can be" should read --to be--; and
Line 37, "7-7 direction" should read --7-7 line--.

COLUMN 11:

Line 20, "compose" should read --composed--.

UNITED STATES PATENT AND TRADEMARK OFFICE
CERTIFICATE OF CORRECTION

PATENT NO. : 7,136,127 B2
APPLICATION NO. : 10/420526
DATED : October 24, 2006
INVENTOR(S) : Watanabe et al.

It is certified that error appears in the above-identified patent and that said Letters Patent is hereby corrected as shown below:

<u>COLUMN 14</u>:

Line 56, "schematic" should read --a schematic--.

<u>COLUMN 15</u>:

Line 2, "large sized" should read --large-sized--; and
    Line 42, "large scaled" should read --large-scale--.

Signed and Sealed this

Seventeenth Day of June, 2008

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,136,127 B2 | Page 1 of 1 |
| APPLICATION NO. | : 10/420526 | |
| DATED | : November 14, 2006 | |
| INVENTOR(S) | : Masahiro Furusawa | |

It is certified that error appears in the above-identified patent and that said Letters Patent is hereby corrected as shown below:

This certificate supersedes the Certificate of Correction issued June 17, 2008. The certificate should be vacated since no Certificate of Correction was granted for this patent number.

Signed and Sealed this

Fifth Day of August, 2008

JON W. DUDAS
*Director of the United States Patent and Trademark Office*